(12) United States Patent
Lee, Jr.

(10) Patent No.: US 8,201,551 B1
(45) Date of Patent: Jun. 19, 2012

(54) GAS FORCED AIR HEATER

(75) Inventor: Joseph B. Lee, Jr., Bowling Green, KY (US)

(73) Assignee: Procom Heating, Inc., Brea, CA (US)

(*) Notice: Subject to any disclaimer, the term of this patent is extended or adjusted under 35 U.S.C. 154(b) by 121 days.

(21) Appl. No.: 12/418,936

(22) Filed: Apr. 6, 2009
(Under 37 CFR 1.47)

(51) Int. Cl.
*F24H 3/02* (2006.01)

(52) U.S. Cl. ............ 126/110 C; 126/104 R; 126/110 B; 126/110 D; 126/59.5; 126/99 A; 432/222

(58) Field of Classification Search .............. 126/104 R, 126/110 B, 59.5, 99 A, 110 C, 110 D; 432/222
See application file for complete search history.

(56) References Cited

U.S. PATENT DOCUMENTS

| | | | |
|---|---|---|---|
| 2,652,888 A | 9/1953 | Allen et al. | |
| 2,994,520 A * | 8/1961 | Sherman | 432/222 |
| 3,036,382 A | 5/1962 | Shotton, Jr. | |
| 3,077,343 A * | 2/1963 | Mohn | 432/49 |
| 3,101,193 A * | 8/1963 | Varvel | 432/223 |
| 3,160,401 A * | 12/1964 | Wollner | 432/222 |
| 3,565,406 A * | 2/1971 | Wollner | 432/223 |
| 4,231,735 A | 11/1980 | Downs | |
| 4,340,362 A | 7/1982 | Chalupsky et al. | |
| 4,942,863 A | 7/1990 | Chou et al. | |
| 5,287,048 A * | 2/1994 | Lakin et al. | 318/459 |
| 5,865,618 A | 2/1999 | Hiebert | |
| 6,152,128 A | 11/2000 | Willey et al. | |
| 6,595,200 B1 | 7/2003 | Dai | |
| 7,600,998 B1 * | 10/2009 | Pitchford et al. | 432/222 |
| 2008/0302351 A1 * | 12/2008 | Hunter et al. | 126/110 B |

* cited by examiner

*Primary Examiner* — Kenneth Rinehart
*Assistant Examiner* — Jorge Pereiro
(74) *Attorney, Agent, or Firm* — John F. Salazar; Scott W. Higdon; Middleton Reutlinger

(57) ABSTRACT

A gas forced air heater is provided. The gas forced air heater has a housing surrounding a combustion chamber and a blower upstream of the combustion chamber. A burner tube of the gas forced air heater has a fuel inlet in a secondary chamber coupled to the housing and a burner head proximal an air inlet opening of the combustion chamber. An air input orifice into the secondary chamber is provided upstream of the combustion chamber and allows air output from the fan to be communicated into the secondary chamber.

18 Claims, 3 Drawing Sheets

GAS FORCED AIR HEATER

CROSS-REFERENCE TO RELATED DOCUMENTS

Not Applicable

TECHNICAL FIELD

This invention pertains to portable space heaters and in particular to a portable gas forced air heater.

BRIEF DESCRIPTION OF THE ILLUSTRATIONS

DETAILED DESCRIPTION

Figure 1:
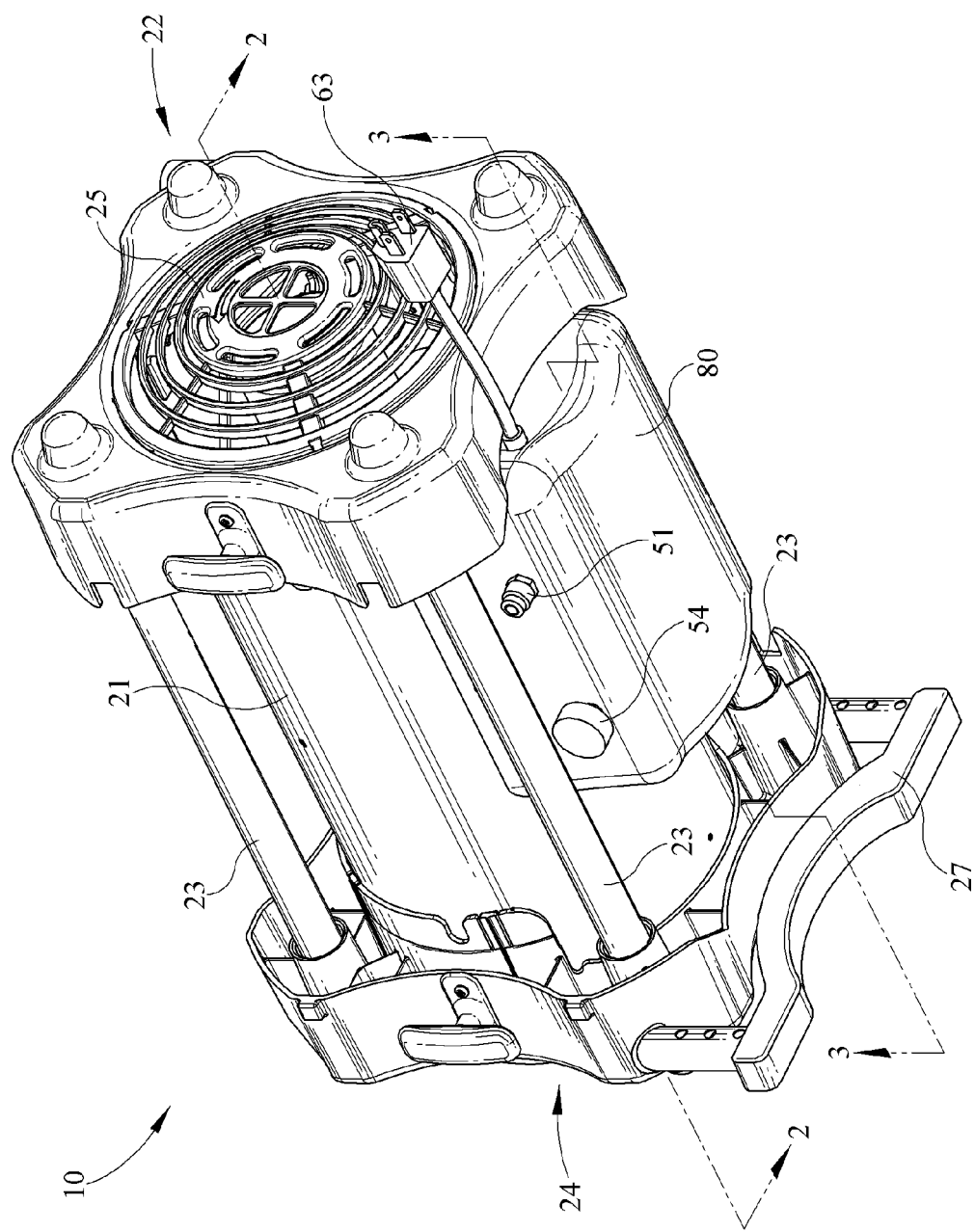
FIG. 1 is a perspective view of an embodiment of a portable gas forced air heater.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Gas forced air heaters conventionally include an outer housing, a combustion chamber mounted within the outer housing, and a fan or blower within the housing located upstream of the combustion chamber. The combustion chamber has an air inlet opening and a discharge opening. A burner head of a burner tube is provided adjacent the air opening of the combustion chamber and supplies a mixture of fuel and air into the combustion chamber, where it is ignited and combusted. The blower draws air from the external environment and directs the air toward the air opening of the combustion chamber, causing the air to move through the combustion chamber and out the discharge opening of the combustion chamber and heater, providing heated air to the surrounding environment. Singular or multiple air flow channels may also be provided between the combustion chamber and the outer housing and the blower may also direct air through the one or more air flow channels for cooling purposes.

A fuel, typically propane or natural gas, is supplied to the burner tube. The burner tube typically includes a fuel inlet into which fuel is released from an adjacent fuel nozzle coupled to a fuel supply, such as, for example, a propane or natural gas tank. Outside air may be allowed to enter the burner tube and mix with the fuel. A venturi effect caused by the air supplied by the blower passing into and through the combustion chamber proximal the burner head draws the mixture of fuel and air into the combustion chamber, where the fuel and air mixture is ignited. A rear head or air diffuser plate may optionally be located between the fan and the combustion chamber to help draw the fuel and air mixture into the combustion chamber and/or to improve combustion characteristics of the fuel and air mixture.

Figure 2:
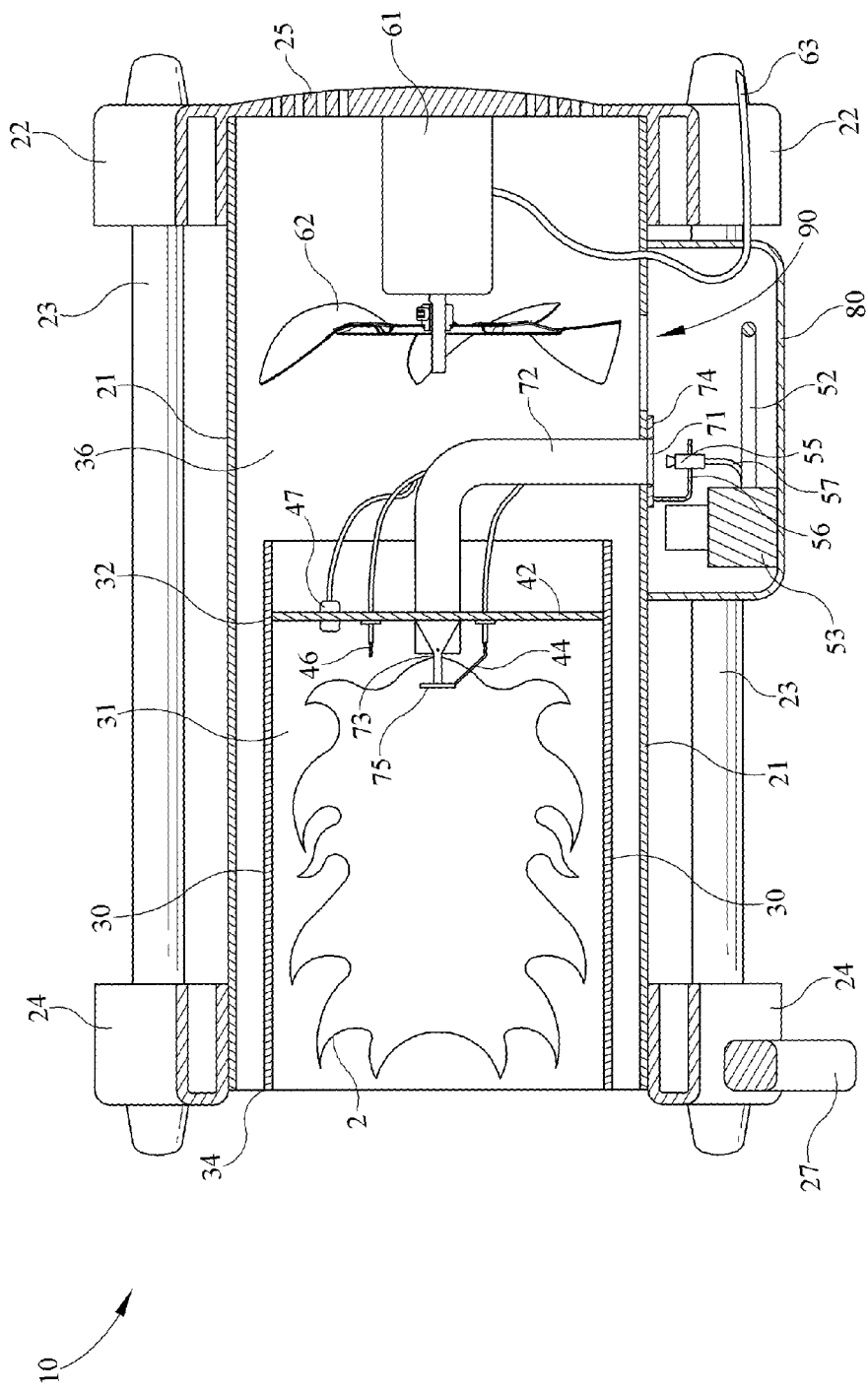
FIG. 2 is a sectional view of the portable gas forced air heater of FIG. 1 taken along the section line 2-2 of FIG. 1.
Figure 3:
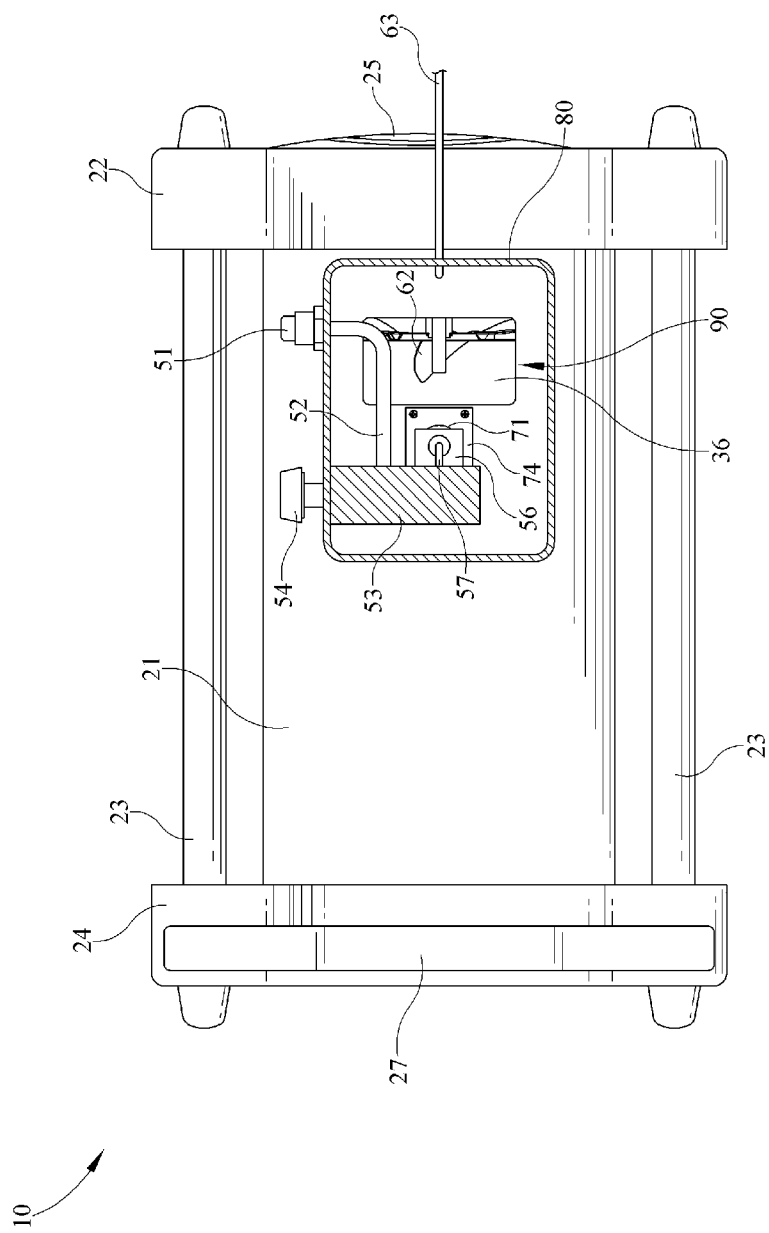
FIG. 3 is a bottom sectional view of the portable gas forced air heater of FIG. 1 taken along the section line 3-3 of FIG. 1.

Referring now to FIG. 1 through FIG. 3, an embodiment of a forced air heater 10 of the present invention is shown. With particular reference to FIG. 1, outer housing 21 is an elongated substantially cylindrical shell or housing, shown in the Figure as being formed from a single piece of sheet metal. Outer housing 21 is not limited to being formed of metal and may be formed from a plurality of sections of sheet metal or other material. Outer housing 21 may be a variety of shapes, sizes, configurations, and still be within the scope of the embodiments. A pair of protective end caps 22 and 24 are provided at either end of the outer housing 21 and are interconnected by a series of roll cage bars 23. End cap 22 is located proximate the inlet end of the forced air heater 10 and provided with a fan inlet cover 25 whereby intake air is provided to the heater. End cap 24 is located proximate the outlet end of the forced air heater 10 adjacent the area where heated air is forced out of the heater and includes an opening for allowing heated air to exit the heater. A foot mechanism 27 extends from end cap 24 and may be adjusted to direct heat output at a variety of angles with respect to a support surface. In alternative embodiments, roll cage bars 23, end cap 22 and/or end cap 24 may be altered or omitted. Moreover, alternative or additional support, protective, and/or aesthetic structure may be included.

With particular reference to FIG. 2, the outer housing 21 surrounds a combustion chamber assembly. The combustion chamber assembly includes a combustion chamber sleeve or wall 30 within which is provided the combustion chamber 31 for the forced air heater 10. The combustion chamber 31 has a first end or air inlet end 32 providing an air inlet opening for combustion chamber 31 and a discharge end 34 providing a discharge opening for combustion chamber 31. Spacing is provided between the outer housing 21 and the combustion chamber sleeve 30, allowing for an air flow channel for appropriate cooling of outer housing 21. In alternative embodiments multiple air flow channels may be provided between the combustion chamber sleeve 30 and the outer housing 21 depending on desired flow and air mixing characteristics.

A fan 62 for providing a flow of air is coupled to a motor 61 and is mounted within the outer housing 21 proximate to the air inlet cover 25. Typically, the motor 61 is driven by AC power as indicated by power cord 63 coupled to motor 61. In various embodiments the motor 61 may be a variable speed motor capable of driving the fan 62 at a plurality of fan speeds. When the fan 62 is driven by the motor 61 it draws a volume of air in through inlet cover 25 and moves the air into an air chamber 36. The air chamber 36 is provided between the fan 62 and combustion chamber 31 and may also include an area located peripherally of the fan 62, where air output from the fan 62 is also forced. A portion of the air output from the fan 62 passes through the air passageway provided between the outer housing 21 and the combustion chamber sleeve 30 and provides cooling air to insulate the outer housing 21 from combustion chamber 31. Optionally, one or more air diverters or air deflector plates may be provided in the air passageway in combination with one or more aperture through the outer housing 21 to deflect some of the cooling air downward to a floor or support surface on which forced air heater 10 rests.

Another portion of the air from fan 62 is directed toward the air inlet end 32 of combustion chamber 31 and passes through one or more apertures in a rear head 42 that is provided adjacent the air inlet end 32. Rear head 42 may optionally include one or more flanges or vanes for directing air flow into combustion chamber 31 to a desired location or with desired flow characteristics. The air passing through rear head 42 provides the moving forced air which is heated by the combustion of fuel within the combustion chamber 31, as indicated by flame 2 and which exits the discharge end 34 of combustion chamber 31 and the discharge of the forced air heater 10 as heated air.

In operation, a gas supply (not shown) may be attached to an inlet connector 51 of the heater by a hose connector and optionally a regulator assembly (not shown). The gas moves from the inlet connector 51 through tubing 52 to a burn rate adjustment valve 53 controllable by a burn rate adjustment knob 54 and from burn rate adjustment valve 53 through tubing 57 to an injector 55. In alternative embodiments, gas may move through a solenoid valve (not shown), the burn rate adjustment valve 53, and out the injector 55 or through an automatic fuel flow rate adjustment valve (not shown) and out the injector 55. In alternative embodiments other gas delivery configurations may be utilized as known in the art. The injector 55 is located within a secondary chamber 80 adjacent a fuel inlet 71 to a burner tube 72. The burner tube 72 extends from the secondary chamber 80 to proximal the air inlet end 32 of the combustion chamber 31. In the depicted embodiment the burner tube 72 is secured to outer housing 21 by a bracket 74 and injector 55 is secured to bracket 74 by bracket 56. Although fuel inlet 71 of burner tube 72 is shown substantially flush with and secured to outer housing 21, in other embodiments fuel inlet 71 may be provided extending more so into secondary chamber 80 and/or secured to secondary chamber 80. In the depicted embodiment the burner tube 72 extends centrally through the rear head 42 and has a burner head 73. Fuel is injected from injector 55 into fuel inlet 71, where it is mixed with air, as described in more detail herein, and entrained through burner tube 72 to the burner head 73 where it is provided unignited into the combustion chamber 31. The unignited air fuel mixture is then ignited and burned as indicated by the flame 2. In alternative embodiments of forced air heater 10, alternative burner heads, burner tubes, burner inlets, and/or injectors may be implemented.

The fuel air mixture may be initially ignited by ignitor 44. Ignitor 44 may be manually or automatically activated. A thermocouple 46 may also be included and when sufficiently heated thermocouple 46 may interact with one or more controls and/or valves to maintain the flow of fuel to the injector 55. Upon loss of a flame, thermocouple 46 may cool and cause one or more valves to shut off the flow of fuel. Upon starting the heater a pushbutton or similar device (not shown) may be manually actuated to maintain the flow of fuel to the injector 55 until the thermocouple 46 is sufficiently heated as is known in the art. A temperature sensor or thermal switch 47 may also be included and may shut off the flow of fuel to injector 55 if heated past a threshold temperature as is known in the art.

The depicted secondary chamber 80 is substantially box shaped and coupled to outer housing 21. An air input orifice 90 is provided upstream of the combustion chamber 30 and through the outer housing 21 into the secondary chamber 80. The air input orifice 90 extends between the air chamber 36 and the secondary chamber 80 and a portion of the air input orifice 90 is in line with individual blades of the fan 62 such that the tips of the fan blades pass immediately adjacent a portion of the air input orifice 90 when the fan 62 rotates. The depicted secondary chamber 80 has one open side and is coupled to outer housing 21 such that outer housing 21 and air input orifice 90 are provided over the open side and secondary chamber 80 is substantially sealed from the external environment, having no other sizeable apertures besides air input orifice 90.

In alternative embodiments alternative configurations may be used for providing an air input orifice 90 that extends between the air chamber 36 and the secondary chamber 80. For example, in alternative embodiments secondary chamber 80 may not include an open side, but may instead only include an air input opening that is approximately the size of and in line with the opening through the outer housing 21. Also, for example, in alternative embodiments the size of the opening through the outer housing 21 may be increased and the secondary chamber 80 may include an opening that is smaller than and in line with the opening through the outer housing 21. Also, in alternative embodiments the exact size and/or location of the air input orifice 90 may vary depending on desired air flow characteristics. For example, in alternative embodiments the size of the air input orifice may be decreased and it may be located upstream from the combustion chamber 31 and downstream and not at all in line with the fan 62. Also, for example, in alternative embodiments the air input orifice 90 and/or secondary chamber 80 may be located elsewhere on the heater besides the portion of the heater designed to be adjacent a support surface. Also, for example, in alternative embodiments the air input orifice 90 may be located upstream of the combustion chamber and downstream of a blower that may or may not be a fan. Also, in alternative embodiments the shape and/or size of the secondary chamber 80 may vary. For example, in some embodiments the secondary chamber 80 may be dome shaped or polygonal. Also, in alternative embodiments the secondary chamber 80 may additionally serve as a support or base for the forced air heater 10, such that the secondary chamber at least partially contacts a support surface and supports the remainder of the forced air heater 10.

In operation of the forced air heater 10, the air input orifice 90 allows some of the air output from the fan 62 to be communicated into the secondary chamber 80, causing static pressure that builds up in the air chamber 36 to be communicated into the secondary chamber 80. In embodiments where a portion of the air input orifice 90 is at least partially aligned with the fan 62, centrifugal air from the fan is forced into the secondary chamber 80 as the fan blades rotate. Secondary chamber 80 is sealed from the external environment enough to enable an increase in pressure in the secondary chamber 80 compared to the pressure of the external environment when fan 62 is operating. In various embodiments the air input orifice 90 enables more air to be entrained at the fuel inlet 71 of the burner tube 72 compared to forced air heaters not having the air input orifice 90 and only employing a single fan. In various embodiments the air input orifice 90 may enable a greater range of heater output with appropriate air-fuel mixture and clean combustion compared to forced air heaters not having the air input orifice 90 and only employing a single fan.

In embodiments where motor 61 is a variable speed motor capable of driving the fan 62 at a plurality of fan speeds, the fan speed and/or the delivery rate of fuel to the burner tube 72 may be varied to vary the heater output. In some embodiments the speed of fan 62 and the delivery rate of fuel to the burner tube 72 may be correspondingly varied. The fuel delivery rate may be manually adjusted by a user in some embodiments by adjusting the burn rate adjustment knob 54. The burn rate adjustment valve 53 may be electrically or mechanically coupled with the motor 61 and correspondingly vary the speed of the fan 62. In alternative embodiments other valves and/or controls may be alternatively or additionally used to vary the flow rate of fuel and/or to vary the speed of the fan 62.

The construction elements of the forced air heater 10 may incorporate steel for the outer housing 21, for the secondary chamber 80, for the combustion chamber 31, the rear head 42, and/or the burner tube 72. Further, the discussed sensors and/or additional sensor devices, such as, but not limited to, an optical sensor may be provided to enable various sensor characteristics to be supplied to a sensor control system to enable proper control of the forced air heater 10. As known in the art, such sensor devices may monitor one or more characteristics of the forced air heater 10 and/or environmental characteristics. For example, the sensor devices may monitor flame optical characteristics within the combustion chamber 31, temperature characteristics within the combustion chamber 31, temperature characteristics of other portions of forced air heater 10, fuel flow rates, air flow rates, and/or CO levels. The one or more sensor devices may be in electrical communication with a control and supply data to the control. The control may include digital logic, a programmable logic device, a programmed microprocessor, or any other suitable electronic control device and may include integral or nonintegral memory. The control monitors the data from the one or more sensor devices and dependent on data received may vary at least one operational aspect of forced air heater 10. For example, the control may cause all or portions of the heater to shut down, may cause a solenoid valve in the fuel line to alter or stop the flow of fuel, may cause the speed of the motor to vary, and/or may cause warning sounds and/or messages to occur.

In some embodiments a control may be provided in electrical communication with one or more temperature sensors placed on, within, or proximal to forced air heater 10. The control may additionally be in electrical communication with a temperature selection device, one or more valves that control the flow of fuel, such as, for example, a solenoid valve, and variable speed motor 61. The control may monitor the one or more temperature sensors and correspondingly vary the flow of fuel via the one or more valves and the speed of the motor 61 in order to maintain a desired temperature as selected by a user via temperature selection device.

The foregoing description has been presented for purposes of illustration. It is not intended to be exhaustive or to limit the invention to the precise forms disclosed, and obviously many modifications and variations are possible in light of the above teaching. It is understood that while certain forms of the invention have been illustrated and described, it is not limited thereto except insofar as such limitations are included in the following claims and allowable functional equivalents thereof.

The invention claimed is:

1. A variable output gas forced air heater, comprising:
a housing surrounding a combustion chamber within which fuel is burned, said combustion chamber having an air inlet and a discharge;
a variable speed fan within said outer housing upstream of said combustion chamber, said fan having a plurality of fan blades producing an air output;
wherein some of said air output from said fan is in flow communication with air inlet of said combustion chamber, moving through said combustion chamber and out said discharge end;
a substantially sealed secondary chamber coupled to said housing;
a burner tube having a fuel inlet in said secondary chamber and a burner head adjacent said air inlet of said combustion chamber;
a fuel nozzle in said secondary chamber adjacent said fuel inlet of said burner tube, said fuel nozzle coupled to a fuel flow rate adjustment valve; and
an air input orifice extending into said secondary chamber, said air input orifice located upstream from said combustion chamber and at least partially in line with said blades of said variable speed fan;
wherein some of said air output from said fan blades is additionally in flow communication with said air input orifice, moving through said air input orifice and into said secondary chamber.

2. The variable output gas forced air heater of claim 1, wherein said secondary chamber is substantially box shaped and has one at least partially open side, said air input orifice and a portion of said housing provided over said one open side.

3. The variable output gas forced air heater of claim 1, wherein said fuel flow rate adjustment valve is manually actuated.

4. The variable output gas forced air heater of claim 1, further comprising an electronic control, said control in electrical communication with said fuel flow rate adjustment valve and said variable speed fan.

5. The variable output gas forced air heater of claim 4, wherein said control correspondingly varies the speed of said variable speed fan and a flow rate of a fuel moving through said fuel flow rate adjustment valve based on input from a user.

6. The variable output gas forced air heater of claim 4, wherein said control is in electrical communication with at least one sensor and correspondingly varies the speed of said variable speed fan and said flow rate of a fuel based at least partially on input received from said at least one sensor.

7. A gas forced air heater, comprising:
an outer housing;
a combustion chamber within said outer housing, said combustion chamber having an air inlet opening and an air outlet opening;
a fan within said outer housing upstream of said combustion chamber, said fan having a plurality of fan blades;
an air chamber positioned between said fan and said first end of said combustion chamber;
a substantially sealed secondary chamber immediately adjacent said outer housing;
a burner tube extending from said secondary chamber to said combustion chamber, said burner tube positioned between said fan and said combustion chamber and having a fuel inlet in said secondary chamber and a fuel exit operably positioned adjacent said air inlet opening of said combustion chamber;
a fuel orifice for delivering a fuel, said fuel orifice operably positioned in said secondary chamber adjacent said fuel inlet of said burner; and
an air orifice located adjacent said fan and extending between said air chamber and said secondary chamber, said air orifice allowing for the communication of air from said air chamber to said secondary chamber, wherein said fan blades are aligned with said air orifice.

8. The gas forced air heater of claim 7 wherein said secondary chamber is generally box shaped.

9. The gas forced air heater of claim 8 wherein said secondary chamber is provided at the base of said forced air heater and may be used as a support for said forced air heater.

10. The gas forced air heater of claim 7 wherein said fan blades are contoured fan blades with fan blade tips; wherein said fan blade tips pass immediately adjacent a portion of said air input orifice when said fan is rotating.

11. The gas forced air heater of claim 10 wherein said outer housing is spaced apart from said combustion chamber providing for an air passageway between said outer housing and said combustion chamber.

12. The gas forced air heater of claim 7, wherein said fuel exit of said burner tube is positioned adjacent a rear head positioned across said air inlet opening of said combustion chamber.

13. The gas forced air heater of claim 12, wherein said rear head has at least one sensor mounted thereto.

14. The gas forced air heater of claim 13, wherein said fuel exit of said burner tube is centrally aligned with respect to said rear head.

15. A forced air heater, comprising:
 a housing surrounding a combustion chamber within which fuel is burned, said combustion chamber having an air inlet opening and a discharge opening;
 a blower upstream of said combustion chamber, said blower having a plurality of blades producing an air output;
 wherein some of said air output from said blower is in flow communication with said air inlet of said combustion chamber, moving through said combustion chamber and out said discharge end;
 a secondary chamber coupled to said housing;
 a burner tube having a fuel inlet in said secondary chamber and a burner head proximal said air inlet opening of said combustion chamber;
 a fuel nozzle in said secondary chamber adjacent said fuel inlet of said burner tube; and
 an air input orifice extending through said housing into said secondary chamber, said air input orifice upstream of said combustion chamber and in line with said blades of said blower;
 wherein some centrifugal air output of said air output from said blower is additionally in flow communication with said air input orifice, moving through said air input orifice and into said secondary chamber.

16. The forced air heater of claim 15 wherein said blower is a fan.

17. The forced air heater of claim 15 wherein said secondary chamber is provided at the base of said forced air heater and may be used as a support for said forced air heater.

18. The forced air heater of claim 17 wherein said housing is spaced apart from said combustion chamber providing for an air passageway between said housing and said combustion chamber, wherein some of said air output from said blower passes through said air passageway.

* * * * *